2,913,424

PROCESS OF SIMULTANEOUSLY FOAMING AND CROSS-LINKING CHLORINATED AND SULFO-CHLORINATED POLYPROPYLENE WITH AN AMMONIUM SALT

Albert Gustav Martin Gumboldt, Frankfurt am Main, and Erich Heitzer, Hofheim (Taunus), Germany, assignors to Farbwerke Hoechst Aktiengesellschaft vormals Meister Lucius & Bruning, Frankfurt am Main, Germany, a corporation of Germany No Drawing. Application December 27, 1956
Serial No. 630,745

Claims priority, application Germany December 28, 1955

4 Claims. (Cl. 260—2.5)

The present invention relates to a process for preparing foamed materials.

Foamed natural or artificial plastics of high molecular weight are finding increasing application in industry. These foamed materials either in a soft or hard state are used, for example, in the form of constructional or building elements, for thermal insulation or deadening sound. Numerous processes are known for converting natural or artificial plastic materials of high molecular weight into stable foams.

Thus, air or an inert gas may be stirred mechanically into a polymer in the molten state or in solution, if desired, with the addition of a foaming or wetting agent, or a readily soluble organic or inorganic compound may be mixed with the material to be foamed, and, after moulding or shaping the material, the said compound is dissolved out to leave voids in the material. Alternatively, a natural or synthetic polymer may be worked up into a paste or kneaded with a low boiling solvent or nonsolvent organic substance, which is expelled by the action of heat during or after the moulding or shaping operation. Very interesting products can also be obtained by adding to the polymer an inorganic or organic substance which decomposes when heated to yield an inert gas. The decomposition products of such organic compounds may remain in the foamed material and act as plasticisers. Furthermore, polymers which contain reactive groups may be foamed by one of the above methods and cross-linked by the addition of a suitable compound. In this manner there are obtained products which, in addition to having high mechanical strength, have a good resistance to organic solvents. The following are some of the substances of high molecular weight known to be suitable for the production of foamed materials: Cellulose, rubber, polystyrene, polyvinyl chloride, polyethylene and polyisobutylene. As polymers containing active groups, which react together with the evolution of gas and cross-linking, compounds which contain isocyanate groups or carboxyl groups are especially important.

Now we have found that cross-linked insoluble solid foamed materials of low inflammability can be made by subjecting a polymer of a lower olefin, and advantageously a low pressure polyolefin, which contains halogen atoms and $SO_2$hal groups, to the action of ammonium carbonate as foaming agent at a temperature of 60–130° C., and preferably 100° C. to 110° C. The ammonium carbonate is advantageously used in a proportion which is substantially equivalent to the quantity of halogen atoms and $SO_2$hal groups in the polymer. The proportion may exceed or fall short of that amount by 10–20%. Instead of ammonium carbonate there can also be used ammonium compounds capable of yielding ammonia and carbon dioxide on thermal decomposition. It could not have been foreseen that the use of ammonium carbonate, which is known as a foaming agent, would lead to cross-linking of the aforesaid polymers and also to the production of almost incombustible foamed materials. The cross-linking is accompanied by chemical combination of the ammonia liberated during the foaming.

Polyolefins have been introduced into industry as the result of the discovery of processes for polymerising lower olefins, such as ethylene, propylene, butylene, pentene and vinyl-cyclohexene, and especially the low pressure process described, for example, in Belgian Patents Nos. 534,792, 534,888 and 540,459. Processes are also known for halogenating or sulpho-halogenating these low pressure polyolefins.

The process of this invention is advantageously carried out in the presence of an organic low boiling solvent such as an aliphatic chlorinated hydrocarbon, for example, methylene chloride, dichlorethane, chloroform or carbon tetrachloride, or a low boiling ester or ketone, such as methyl formate, ethyl acetate, acetone, or methyl ethyl ketone, by pasting the polymer with the solvent in a ratio within the range of 10:90 to 90:10, advantageously 80:20 and, after incorporating the equivalent quantity of ammonium carbonate or a commercial mixture of ammonium carbonate and ammonium carbamate.

The mass so obtained is charged, for example, into moulds, and the shaping operation is carried out at a raised temperature and, if desired, with the application of superatmospheric or subatmospheric pressure. The moulds may be heated, for example, in steam or suitable hot baths. There may also be added to the material to be shaped another known organic foaming agent, such as $\alpha$:$\alpha$-azo-di-isobutyric acid nitrile, benzeneazo-aniline, benzene sulphonic acid hydrazide or the like. There may also be added to the material to be shaped an ordinary plasticiser, such as a phthalic acid ester, phosphoric acid cresyl ester, chloroparaffin or the like, when it is desired to obtain soft foamed products.

The following examples serve to illustrate the invention but they are not intended to limit it thereto, the parts being by weight:

Example 1

100 parts of a chlorinated and sulphochlorinated polypropylene of high molecular weight, which has the viscosity $\eta$ spec. $c=1.2$ (determined in a solution of 0.5% strength in tetrahydronaphthalene at 130° C.) and a chlorine content of 34.7% and a sulphur content of 4.4%, are kneaded with 100 parts of methylene chloride and 13.2 parts of commercial ammonium carbonate, and the mixture is introduced into a mould and heated therein in vacuo for 3 hours in a current of steam at 100° C. The mould is then opened and the foamed cake is heated for a further 30 minutes at 130° C. A further increase in volume occurs and, after cooling, there is obtained a fine-bubbled foamed product weighing 76 grams per litre. The product, which dissolved well in chloroform and ethyl acetate before the treatment, is insoluble after the treatment. When brought into contact with a flame the product carbonises, but combustion does not persist when the flame is withdrawn. The resulting foamed material has a considerable strength and stiffness and can be sawn into plates or blocks.

Example 2

100 parts of a chlorinated and sulphochlorinated polypropylene of relatively low molecular weight having a degree of polymerisation of 22, and having a chlorine content of 50% and a sulphur content of 4%, are triturated with 12 parts of commercial ammonium carbonate. The resulting mass is intimately mixed with 50 parts of methylene chloride, and the mixture is introduced into a mould and the mould heated for 3 hours in a current of steam at 100° C. The mould is then opened, and the foamed cake is heated for 30 minutes at 130° C. The foamed material so obtained weighs 100 grams per litre, and its mechanical strength is lower than that of the foamed material obtained as described in Example 1.

We claim:

1. A process for the production of an insoluble solid foamed material which comprises reacting (1) an ammonium salt selected from the group consisting of ammonium carbonate and ammonium carbamate, with (2) a chlorinated and sulfochlorinated polypropylene at a temperature in the range from 60–130° C., resulting in the simultaneous foaming and cross-linking of the polymer by decomposition of the ammonium salt to liberate ammonia and $CO_2$, the $CO_2$ acting as a foaming agent and the ammonia acting not only as a foaming agent but also to cross-link the polymer by chemical combination therewith.

2. Process of claim 1 wherein ammonium carbonate is employed.

3. Process of claim 1 wherein said reactants are mixed with a member of the group consisting of methylene chloride, chloroform, carbon tetrachloride, methyl formate, ethyl acetate, acetone and methyl ethyl ketone; and the weight ratio of polymer to said member is within the range of 10:90 to 90:10.

4. Process of claim 3 wherein the mixture is charged into a mold and heated at about 100° C. to form a foamed cake, and the latter is then removed from the mold and heated at about 130° C. to effect a further increase in volume, the final product being a fine-bubbled foamed product having considerable strength and stiffness and which is resistant to chemical dissolution.

References Cited in the file of this patent

UNITED STATES PATENTS

| | | |
|---|---|---|
| 2,507,699 | Edgar et al. | May 16, 1950 |
| 2,525,880 | Feldman | Oct. 17, 1950 |
| 2,628,945 | Wayne | Feb. 17, 1953 |

OTHER REFERENCES

Dupont Information Bulletin ("Hypalon" Synthetic in Hog-Melt Blends), No. X–8, page 7. Date filed with U.S. Patent Office, March 12, 1951.